July 6, 1965

A. MOSCARDINI 3,193,336

COOLING ARRANGEMENT FOR ROTOR BEARING

Filed June 19, 1962

INVENTOR.
Arthur Moscardini
BY
Wayne Lang
AGENT

July 6, 1965 A. MOSCARDINI 3,193,336
COOLING ARRANGEMENT FOR ROTOR BEARING
Filed June 19, 1962 2 Sheets-Sheet 2

INVENTOR.
Arthur Moscardini
BY
Wayne Lang
AGENT

United States Patent Office 3,193,336
Patented July 6, 1965

3,193,336
COOLING ARRANGEMENT FOR ROTOR BEARING
Arthur Moscardini, Wellsville, N.Y., assignor, by mesne assignments, to The Air Preheater Company, Inc., a corporation of Delaware
Filed June 19, 1962, Ser. No. 203,561
2 Claims. (Cl. 308—77)

The present invention relates to a bearing for a rotary regenerative heat exchanger, and particularly it relates to an arrangement that precludes the transmission of excessive heat to the bearing from either an internal or an external source while it simultaneously dissipates the heat of friction produced by the bearing itself.

In heat exchanger apparatus of the rotary regenerative type, heating gas and relatively cooler air or other fluid to be heated pass in counterflow relation through opposite sides of a heat absorbent matrix, that is being rotated either continuously or intermittently about its central axis. The heat absorbent matrix continuously absorbs heat from the hot gas and gives it up to the cooler air or other fluid to be heated as the rotor is rotated about its axis. The rotor is mounted on a central rotor post that has support trunnions at either end thereof rotatably carried by bearings fixedly secured to a suitable support structure.

During operation of heat exchange apparatus as herein defined, heat generated by the bearing itself during operation must be continuously dissipated if its temperature is to be maintained within satisfactory limits. Cooling arrangements for such a heating problem have been devised whereby heat from the bearing is transferred to a coolant such as water or oil. With most heat exchange apparatus however, internal heat produced by the bearing is only partially responsible for the temperature rise within the bearing, since heat from the hot gas is continuously conducted through the rotor structure to the support trunnion and to the bearing. Moreover, heat from an extraneous source is commonly radiated on to the bearing so that excessive temperature rise may be due to a combination of internal friction, conduction from hot rotor structure, and radiation from an extraneous source.

The principal object of this invention therefore is to provide an arrangement that simultaneously dissipates the heat of friction produced by the bearing, removes heat from the trunnion before it may be conducted to the bearing, and precludes the radiation of heat from an extraneous source of heat on to the bearing so that it is free to operate within satisfactory limits.

It is a further object of this invention to provide an arrangement of the type defined that provides maximum effectiveness with a minimum cost.

These and other objects of my invention will become more apparent upon reference to the drawing in which.

Figure 1:
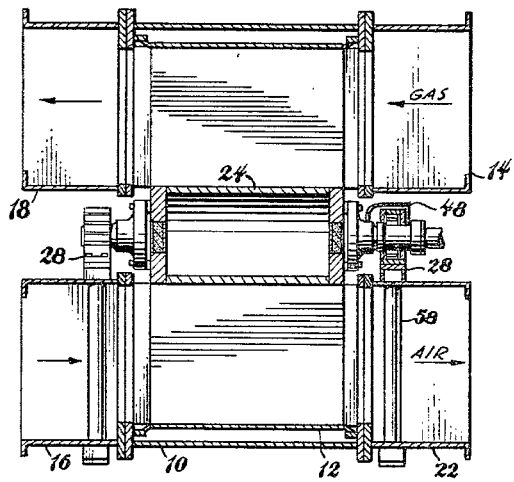
FIGURE 1 shows a horizontal section of a rotary regenerative heat exchanger including a bearing cooling arrangement of the type defined herein.
Figure 2:
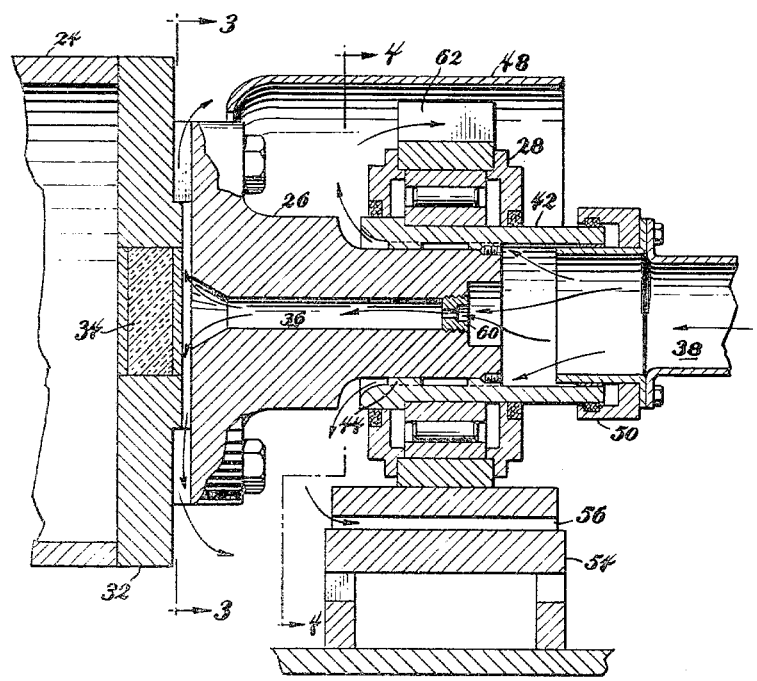
FIGURE 2 is an enlarged sectional elevation of a rotor trunnion including a rotor support bearing.
Figure 3:
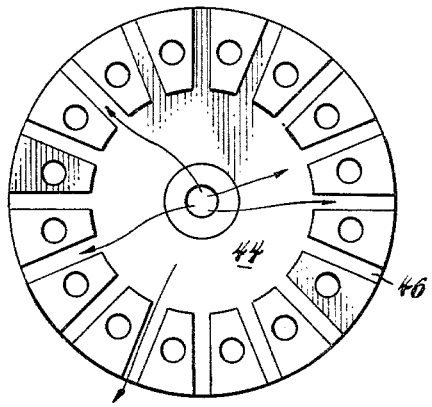
FIGURE 3 is a view as seen from line 3—3 of FIGURE 2.
Figure 4:
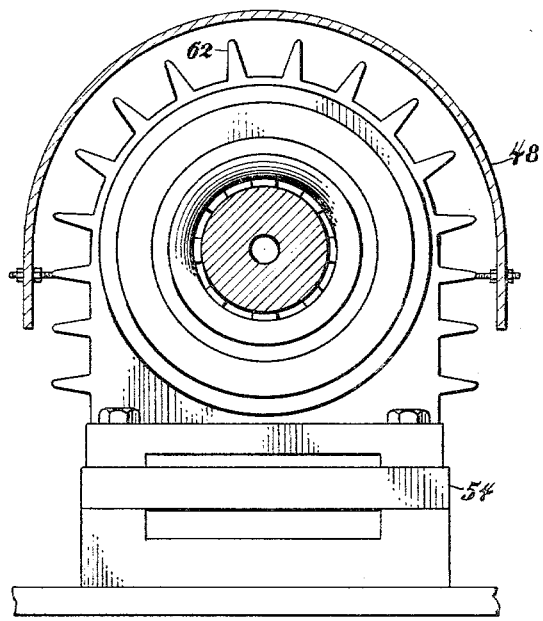
FIGURE 4 is a view as seen from line 4—4 of FIGURE 2.

In the drawing the arrangement shown includes a housing 10 which surrounds the rotor 12 containing a mass of heat absorbent material which is alternately brought into contact with hot gases entering an inlet 14 and cooler air entering the heat exchanger through an inlet 16. As the heat absorbent material carried by the rotor is contacted by the hot gas it absorbs heat therefrom, and upon rotation about its axis, deposits the heated material in the path of the cooler air where the heat is transferred thereto. The then cooled gas is exhausted from the heat exchanger through a duct 18 while the heated air is exhausted at 22. The rotor is rotated about its axis either continuously or intermittently by any suitable means not illustrated in the drawing.

The rotor is mounted on a cylindrical rotor post 24 having support trunnions 26 at either end which are carried by the support bearings 28. The trunnion is secured directly to an annular plate 32 whose central aperture is filled with a quantity of thermal insulating material shown at 34. This thermal insulation material partially isolates the heat of the central portion of the rotor post from the integrally mounted trunnion to retard the conduction of heat thereto.

In accordance with this invention therefore, the trunnion 26 at one or both ends of the rotor is provided with a cooling means which effectively limits the amount of rotor heat which may be conducted from the rotor post to its cooperating support bearing. When only a single trunnion is provided with cooling means, the trunnion at the "hot end" of the rotor lying adjacent the inlet 14 for the hot gas is selected, although duplicate arrangements for trunnions at spaced ends of the rotor post may be readily utilized to control the temperature level at each bearing.

The cooling arrangement comprises essentially a central passageway 36 in the trunnion 26 which is connected to a source of cooling fluid 38. The trunnion 26 is provided with a cylindrical collar 42 having a series of spaced ridges or lands 44 with grooves therebetween that permit cooling fluid from the source 38 to also flow through passageways intermediate the collar 42 and the trunnion 26.

The cooling fluid which flows through trunnion passageway 36 is directed to an annular chamber 44 where it passes radially outward through interconnected passageways 46 to the ambient atmosphere. On passing radially through the passageways 46, the cooling fluid intercepts heat being conducted from the annular plate 32 of the rotor post to the trunnion 26 and dissipates it in the atmosphere that surrounds the bearing.

The trunnion 26 together with its cylindrical collar 42 fits snugly through the bearing 28 which is in turn firmly mounted on a fixed support 54 that bears upon a pedestal 58. A sealing arrangement 50 between the fixed source of cooling fluid 38 and the rotatable collar 42 prevents leakage of cooling fluid as it flows from its source to the collar 42 for distribution through the trunnion and around the bearing. A restriction 60 effectively proportions flow of the cooling fluid from its source 38 to the passageway 36 and to the grooves between lands 44 whereby cooling fluid in predetermined amounts may be directed through said grooves intermediate the trunnion 26 and collar 42 and through the passageways 36. The restriction 60 as illustrated is formed in a threaded plug which is adapted to be readily removed and replaced with a plug containing an orifice of different dimensions whereby fluid flow to the different passageways of the trunnion may be effectively varied.

After a portion of the cooling fluid has traversed the grooves between lands 44 its flow is reversed by a fixed shield 48 whereby the cooling fluid may flow over the fins 62 on the outer surface of the bearing. While the shield 48 serves to direct the cooling fluid over the fins it also serves to shield the bearing 28 from heat that is radiated outward from the hot gas duct 14. Cooling fluid that flows through trunnion passageways 36-46 flows over the shield 48 on the upper side of the bearing and through the opening 56 in the support member 54 at the lower side of the bearing to provide a sheath of moving air or other cooling fluid that completely surrounds the bearing.

Thus a succession of insulating and cooling arrangements cooperate to dissipate heat from the rotor and heat from the bearings so that the operating temperature of the bearing may be maintained within acceptable limits.

While this invention has been described with reference to the embodiment illustrated in the drawing, it is apparent that various changes may be made without departing from the spirit of the invention. It is intended therefore that all matter contained in the above description or shown in the accompanying drawings shall be interpreted as illustrative and not in a limiting sense.

I claim:

1. Support means for rotary apparatus having a cylindrical rotor carrier by a central rotor post, said support means including a support trunnion having an axially disposed supply duct extending therethrough, and a series of dependent radial cooling passageways in an end face thereof, means connecting the trunnion to an end of said rotor post to position the radial cooling passageways intermediate the rotor post and the rotor trunnion, a bearing supporting said trunnion for rotation about its axis, a grooved collar intermediate the trunnion and the bearing, and a source of cooling fluid connected in parallel to the supply duct and to the grooves of said collar whereby heat is simultaneously removed from the bearing and the trunnion by an independent cooling fluid.

2. Support means as recited in claim 1 including a shield spaced from said bearing adapted to provide interference for the radiation of heat from an external source on to said bearing and simultaneously recirculate cooling fluid from said grooves over the bearing.

References Cited by the Examiner

UNITED STATES PATENTS

| | | | |
|---|---|---|---|
| 2,173,489 | 9/39 | Voigt | 308—77 |
| 2,439,127 | 4/48 | Dailey et al. | 308—77 X |
| 2,714,538 | 8/55 | Hornbastel | 308—77 |
| 2,789,021 | 4/57 | Pedersen | 308—77 X |
| 2,813,698 | 11/57 | Lincoln | 165—7 X |
| 2,846,600 | 8/58 | Potter | 308—77 X |
| 3,097,027 | 7/63 | Mims et al. | 308—77 X |

CHARLES SUKALO, *Primary Examiner.*